(12) United States Patent
Jens et al.

(10) Patent No.: US 9,928,584 B2
(45) Date of Patent: Mar. 27, 2018

(54) INSPECTING PLANTS FOR CONTAMINATION

(71) Applicant: Harvest Moon Automation Inc., Winchester, MA (US)

(72) Inventors: Stephen Jens, Winchester, MA (US); Janice Huxley Jens, Winchester, MA (US); Edward Dickinson, Leicester, MA (US)

(73) Assignee: Harvest Moon Automation Inc., Winchester, MA (US)

( * ) Notice: Subject to any disclaimer, the term of this patent is extended or adjusted under 35 U.S.C. 154(b) by 0 days.

(21) Appl. No.: 15/206,753

(22) Filed: Jul. 11, 2016

(65) Prior Publication Data

US 2018/0012344 A1  Jan. 11, 2018

(51) Int. Cl.
*G06K 9/66* (2006.01)
*G06T 7/00* (2017.01)
*G06K 9/00* (2006.01)

(52) U.S. Cl.
CPC .......... *G06T 7/001* (2013.01); *G06K 9/00657* (2013.01); *G06T 2207/30188* (2013.01)

(58) Field of Classification Search
None
See application file for complete search history.

(56) References Cited

U.S. PATENT DOCUMENTS

| 117,705 A | 8/1871 | Warren et al. |
| 218,795 A | 8/1879 | Thompson |
| 811,978 A | 2/1906 | Weigen |

(Continued)

FOREIGN PATENT DOCUMENTS

| EP | 267860 | 4/1990 |
| EP | 1002460 A1 | 4/2003 |

(Continued)

OTHER PUBLICATIONS

Authorized Officer Arnaud Benedetti, International Search and Written Opinion for International Application No. PCT/US2016/028631, dated Jul. 13, 2016, 13 pages.

(Continued)

*Primary Examiner* — Tahmina Ansari
(74) *Attorney, Agent, or Firm* — Fish & Richardson P.C.

(57) ABSTRACT

A method of inspecting plants for contamination includes generating a first series of images of a plant, identifying a region of interest displayed in the first series of images, comparing a color parameter of the region of interest to a color criterion associated with a type of contamination, comparing a morphological parameter of the region of interest to a reference parameter associated with the type of contamination, and upon determining that the color parameter meets the color criterion and that the morphological parameter sufficiently matches the reference parameter, identifying the region of interest as a region of contamination on the plant. The method further includes transmitting an instruction to lift a cutter of a harvester up from a planting bed to avoid harvesting the plant in response to identifying the region of interest as the region of contamination, and generating a second series of images of an additional plant.

30 Claims, 6 Drawing Sheets
(1 of 6 Drawing Sheet(s) Filed in Color)

(56) References Cited

U.S. PATENT DOCUMENTS

| | | | |
|---|---|---|---|
| 2,544,023 A | 3/1951 | Johnson | |
| 2,583,571 A | 1/1952 | Howe | |
| 2,825,273 A | 3/1958 | Faucheux | |
| 4,519,193 A | 5/1985 | Yoshida | |
| 4,532,757 A | 8/1985 | Tutle | |
| 4,843,561 A | 6/1989 | Larson | |
| 4,873,644 A | 10/1989 | Fujii et al. | |
| 4,975,016 A | 12/1990 | Pellenc et al. | |
| 5,054,232 A | 10/1991 | Rhode | |
| 5,544,474 A | 8/1996 | Finkelstein | |
| 6,919,959 B2 | 7/2005 | Masten | |
| 7,215,420 B2 | 5/2007 | Gellerman et al. | |
| 7,725,233 B2 | 5/2010 | Hendrickson et al. | |
| 7,765,780 B2* | 8/2010 | Koselka | A01D 46/30 56/10.2 A |
| 8,194,916 B2* | 6/2012 | Ma | G06K 9/00657 382/100 |
| 8,272,200 B1 | 9/2012 | Ottaway | |
| 8,381,501 B2 | 2/2013 | Koselka et al. | |
| 8,401,231 B2* | 3/2013 | Maxik | H05B 37/0227 315/152 |
| 8,437,498 B2* | 5/2013 | Malsam | A01G 25/092 239/71 |
| 8,452,501 B1 | 5/2013 | Lange et al. | |
| 8,642,910 B2 | 2/2014 | Pellenc et al. | |
| 8,841,570 B2 | 9/2014 | Vasilescu | |
| 8,855,412 B2 | 10/2014 | Quan et al. | |
| 9,282,688 B2 | 3/2016 | Casper et al. | |
| 9,462,749 B1 | 10/2016 | Jens et al. | |
| 9,468,152 B1 | 10/2016 | Jens et al. | |
| 2001/0016053 A1* | 8/2001 | Dickson | G01J 3/2803 382/110 |
| 2002/0022929 A1 | 2/2002 | Ell | |
| 2002/0024665 A1 | 2/2002 | Masten | |
| 2005/0126144 A1 | 6/2005 | Koselka et al. | |
| 2008/0110026 A1 | 5/2008 | Marcoe | |
| 2009/0293442 A1 | 12/2009 | Chang et al. | |
| 2011/0022231 A1* | 1/2011 | Walker | A01D 46/264 700/259 |
| 2011/0046785 A1 | 2/2011 | Leelen | |
| 2011/0047951 A1 | 3/2011 | Moore | |
| 2011/0211733 A1 | 9/2011 | Schwarz | |
| 2012/0096823 A1 | 4/2012 | Moore | |
| 2013/0204437 A1 | 8/2013 | Koselka | |
| 2013/0238201 A1 | 9/2013 | Redden | |
| 2013/0325346 A1 | 12/2013 | McPeek et al. | |
| 2014/0168412 A1 | 6/2014 | Shulman et al. | |
| 2014/0180549 A1 | 6/2014 | Siemens et al. | |
| 2014/0259898 A1 | 9/2014 | Jens | |
| 2014/0260148 A1 | 9/2014 | Jens | |
| 2014/0314280 A1 | 10/2014 | Lee | |
| 2015/0027040 A1 | 1/2015 | Redden | |
| 2016/0078304 A1 | 3/2016 | Bremer et al. | |
| 2016/0309650 A1 | 10/2016 | Jens et al. | |
| 2017/0061211 A1* | 3/2017 | Hundley | G06K 9/00657 |
| 2018/0012347 A1 | 1/2018 | Jens et al. | |

FOREIGN PATENT DOCUMENTS

| | | |
|---|---|---|
| JP | 03506779 | 3/2004 |
| JP | 2009027977 A | 2/2009 |
| SU | 1045848 | 10/1983 |
| SU | 1289412 | 2/1987 |
| WO | WO1996025842 | 8/1996 |
| WO | WO1998053961 | 12/1998 |
| WO | WO2005092077 A2 | 3/2006 |
| WO | WO2007088225 | 8/2007 |
| WO | WO2008037035 | 4/2008 |
| WO | WO2006063314 | 4/2009 |
| WO | WO2010063075 | 6/2010 |
| WO | WO2011041924 | 4/2011 |
| WO | WO2015121809 | 8/2015 |
| WO | WO2016171789 A1 | 10/2016 |
| WO | WO2016200494 A1 | 12/2016 |

OTHER PUBLICATIONS

Authorized Officer E. Eskina, International Search and Written Opinion for International Application No. PCT/US2016/018859, dated May 12, 2016, 8 pages.

Authorized Officer Agnes Wittmann-Regis, International Preliminary Report on Patentability for International Application No. PCT/US2016/028631, dated Dec. 21, 2017, 9 pages.

Authorized Officer T. Vladimirova, International Search and Written Opinion for International Application No. PCT/US2017/033497, dated Aug. 31, 2017, 8 pages.

Authorized Officer Mineko Mohri, International Preliminary Report on Patentability for International Application No. PCT/US2016/018859, dated Nov. 2, 2017, 7 pages.

* cited by examiner

INSPECTING PLANTS FOR CONTAMINATION

TECHNICAL FIELD

This invention relates to inspecting plants for contamination, and more particularly to avoiding contact with contaminated plants during a harvesting operation.

BACKGROUND

Harvesting leafy vegetable plants typically involves moving a harvester (e.g., an automated harvester) across a field under the guidance of an operator steering the harvester and visually inspecting plants that are harvested from the field for contamination by other personnel riding on the harvester. Sunlight and warm temperatures during the daytime can cause some leafy vegetable plants (e.g., baby green vegetable plants) to become tender and pliable and to wilt, rendering a stature of the plants as less than optimal for cutting by a harvester. Accordingly, harvesting operations are often performed on some leafy vegetable plants at night, when the plants are stiffer and tend to stand taller and more erect. As a harvester moves along a field during a harvesting operation, an operator looks ahead of the harvester to scan the field for contaminated plants. In some cases, personnel may walk the field before the harvesting operation (e.g., during the daytime) to search for contaminated plants. The personnel may mark the contaminated plants (e.g., with flags or other markers) so that the operator is alerted to the contaminated plants during a subsequent harvesting operation.

If the operator of the harvester recognizes contaminated plants, then the operator may attempt to avoid harvesting the contaminated plants by steering the harvester around the contaminated plants to prevent the cutter from contacting the contaminated plants. Limited visibility in the dark can sometimes result in contaminated plants being overlooked or in contaminated plants being identified too slowly, such that the contaminated plants are cut by the harvester. If the operator or the personnel riding on the harvester discover that contaminated plants have been harvested, then the contaminated plants are discarded and the harvester has to be shut down and decontaminated (e.g., disinfected or sterilized) before harvesting can resume. Similarly, if contaminated plants are discovered at a processing plant (e.g., post-harvest), then the contaminated plants and all in-process plants are discarded and a processing line has to be shut down and decontaminated. Such contamination incidents occurring at a harvester or at a processing line can result in costly expenses and significant dangers to food safety.

SUMMARY

The invention involves a realization that improvements in inspecting plants (e.g., leafy vegetable plants) for contamination in an automated manner can improve a yield of a harvesting operation by preventing downtime of harvesting machinery and reducing product rejection (e.g., preventing contamination of previously harvested plants). Such automated inspections advantageously provide large amounts of accurate information that successfully identifies contaminated plants in real time based on image analyses. A plant inspection system configured to perform such inspections can allow a field to be harvested efficiently and during periods of limited visibility (e.g., at night) while avoiding dangerous contamination of previously harvested plants such that food safety is maintained and while avoiding costly shutdowns and decontaminations of a harvester or of a downstream (e.g., post-harvest) processing line (e.g., at a processing plant).

One aspect of the invention features a method of inspecting plants for contamination. The method includes generating a first series of images of a plant disposed along a planting bed using a camera mounted to a frame being moved along the planting bed by a harvester, identifying a region of interest displayed in the first series of images from feature boundary data defined by color regions associated with the first series of images, comparing a color parameter of the region of interest to a color criterion associated with a type of contamination, comparing a morphological parameter of the region of interest to a reference parameter associated with the type of contamination, and upon determining that the color parameter meets the color criterion and that the morphological parameter sufficiently matches the reference parameter, identifying the region of interest as a region of contamination on a surface of the plant. The method further includes transmitting data including an instruction to lift a cutter of the harvester up from the planting bed to avoid harvesting the plant in response to identifying the region of interest as the region of contamination, and while the cutter of the harvester is being lifted up from the planting bed, generating a second series of images of an additional plant disposed along the planting bed using the camera as the frame continues to be moved along the planting bed by the harvester.

In some embodiments, the camera is a portion of a machine vision system that is operable to analyze the first and second series of images.

In certain embodiments, the machine vision system is operable to generate first and second series of machine vision views respectively associated with the first and second series of images.

In some embodiments, the camera is located forward of the harvester such that the camera generates images of plants disposed along the planting bed before the plants can be severed from the planting bed by the cutter.

In certain embodiments, the method further includes maintaining a predetermined vertical distance between the camera and the planting bed.

In some embodiments, the method further includes illuminating the plant using one or more lights associated with the camera while the first and second series of images are generated.

In certain embodiments, the method further includes blocking environmental light from impinging upon the plant and the additional plant while the first and second series of images are generated, respectively.

In some embodiments, the method further includes identifying the region of interest using a blob analysis.

In certain embodiments, the blob analysis identifies portions of the region of interest that share one or more colors and determines a border around the portions.

In some embodiments, the morphological parameter is a shape of the region of interest.

In certain embodiments, the morphological parameter is a size of the region of interest.

In some embodiments, the type of contamination includes fecal matter, disease, rodents, insects, or foreign matter.

In certain embodiments, the plant is a leafy vegetable plant.

In some embodiments, the leafy vegetable plant is a baby green vegetable plant.

In certain embodiments, the leafy vegetable plant is a mature green vegetable plant.

In some embodiments, the method further includes storing a first series of machine vision views associated with the first series of images in association with position coordinates of the region of contamination in response to identifying the region of interest as the region of contamination.

In certain embodiments, the method further includes storing a record of a lifting action taken by the cutter to avoid harvesting the plant.

In some embodiments, the method further includes generating a report including information related to an identification of the region of interest as the region of contamination.

In certain embodiments, the method further includes determining whether or not the cutter contacted the plant based on a height to which the cutter was lifted and an amount of time elapsed between the data being transmitted and the cutter being lifted.

In some embodiments, the data is transmitted wirelessly.

In certain embodiments, the instruction includes an actuation of a light that can alert an operator of the harvester.

In some embodiments, the instruction includes a message displayed on a computing device associated with the harvester.

In certain embodiments, the instruction includes a control signal to automatically lift the cutter.

In some embodiments, the method further includes transmitting data including a subsequent instruction to lower the cutter of the harvester towards the planting bed to continue harvesting plants from the planting bed after the cutter has been lifted up from the planting bed.

In certain embodiments, the method further includes transmitting data including a subsequent instruction to cease a harvesting operation and to decontaminate one or more portions of the harvester.

In some embodiments, the method further includes moving the plant to expose hidden regions of contamination on the surface of the plant while the first and second series of images are generated.

In certain embodiments, moving the plant includes moving the plant forward and backward with a flexible comb.

In some embodiments, moving the plant includes blowing air toward the plant.

In certain embodiments, the method further includes generating a third series of images of the additional plant using an additional camera mounted to the harvester after the additional plant has been harvested by the cutter and transported to a conveyor belt.

Another aspect of the invention features a plant inspection system that includes a camera that is configured to generate a first series images of a plant disposed along a planting bed, a processor that is associated with the camera, and a controller that is communicably coupled to the processor. The camera is mounted to a frame being moved along the planting bed by a harvester. The processor is configured to identify a region of interest displayed in the first series of images from feature boundary data defined by color regions associated with the first series of images, compare a color parameter of the region of interest to a color criterion associated with a type of contamination, compare a morphological parameter of the region of interest to a reference parameter associated with the type of contamination, and upon determining that the color parameter meets the color criterion and that the morphological parameter sufficiently matches the reference parameter, identify the region of interest as a region of contamination on a surface of the plant. The controller is configured to transmit data including an instruction to lift a cutter of the harvester up from the planting bed to avoid harvesting the plant in response to the processor identifying the region of interest as the region of contamination while the camera generates a second series of images of an additional plant disposed along the planting bed as the frame continues to be moved along the planting bed by the harvester.

The details of one or more embodiments of the invention are set forth in the accompanying drawings and the description below. Other features, aspects, and advantages of the invention will be apparent from the description, drawings, and claims.

BRIEF DESCRIPTION OF THE DRAWINGS

This patent or patent application publication contains at least one drawing executed in color. Copies of this patent or patent application publication with color drawing(s) will be provided by the Office upon request and payment of the necessary fee.

Like reference symbols in the various figures indicate like elements.

DETAILED DESCRIPTION

A plant inspection system for identifying contaminated plants during a harvesting operation is described below. The described plant inspection system includes a manipulation device, a machine vision system, and associated control elements that allow the plant inspection system to identify contaminated regions on plant components in an automated and real time manner, thereby improving a yield of a harvesting operation as compared to that which would be achieved using conventional harvesting techniques. Plants that may be examined by the plant inspection system include leafy vegetable plants (e.g., baby green vegetable plants and mature green vegetable plants) and other vegetable plants grown in fields.

Figure 1:
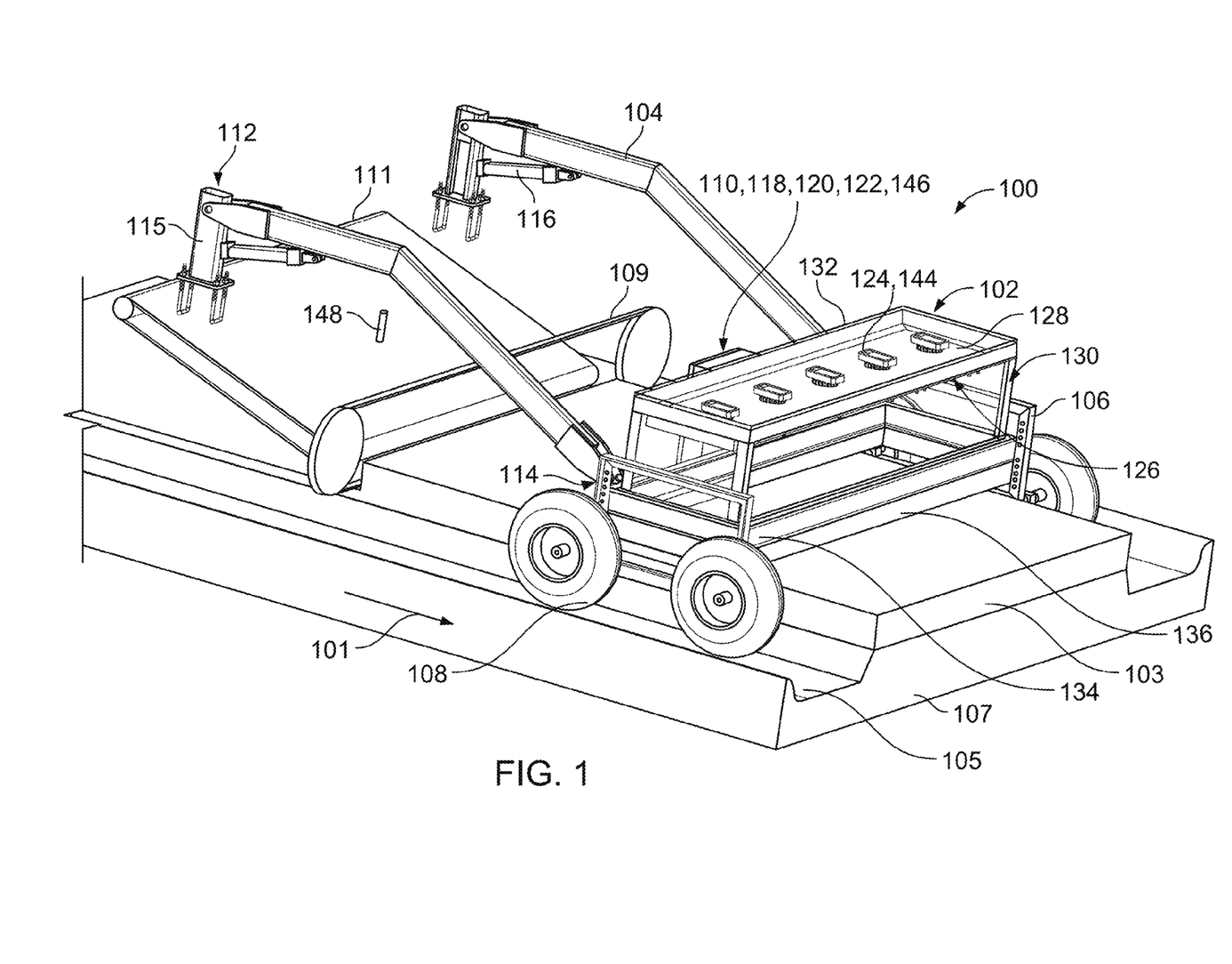
FIG. 1 is a perspective view of a plant inspection system associated with components of a harvester.

FIG. 1 displays a perspective view of a plant inspection system 100 that is operable to identify various types of contamination on plants in real time. Types of contamination that can be identified by the plant inspection system 100 include feces (e.g., bird feces and other animal feces), disease (e.g., mildew and other fungal contamination, leaf tip burn, and viruses, such as lettuce mosaic virus and cucumber mosaic virus), rodents (e.g., mice and snakes), insects, foreign matter (e.g., paper, trash, and plastic bags), and other forms of contamination. In the example of FIG. 1, the plant inspection system 100 is mounted to a harvester (e.g., an automated harvester) for inspecting leafy vegetable plants grown in a field and harvested in bulk (e.g., harvested in multiple quantities non-selectively and simultaneously), such as baby green vegetable plants. Example baby green vegetable plants that may be inspected by the plant inspection system 100 include baby leaf spinach plants, baby romaine plants, baby red romaine plants, baby red chard plants, tango plants, radicchio plants, arugula plants, red mustard plants, lolla rossa plants, tango plants, frisee plants, mizuna plants, green oak leaf plants, curly endive plants, baby leaf lettuce plants, baby leaf mustard plants, cilantro plants, parsley plants, kale plants, escarole plants, green leaf plants, green butter plants, and tatsoi plants.

The plant inspection system 100 is mounted to a frame 115 located along a front side of the harvester, which moves in a forward direction 101 along a planting bed 107 (e.g., a bed of soil) in which multiple rows (e.g., parallel rows) of leafy vegetable plants 103 are planted. (For illustration purposes, the multiple rows of leafy vegetable plants 103 are represented by a single block 103 in FIG. 1.) The planting bed 107 is disposed between opposing furrows 105, and the plants 103 are elevated with respect to a top surface of the planting bed 107. In some examples, the plants 103 have a height (e.g., with respect to the top surface of the planting bed 107) of about 10 cm to about 25 cm (e.g., about 15 cm), and the planting bed 107 has a width of about 150 cm to about 170 cm (e.g., about 160 cm). The planting bed 107 can extend a length that is governed by a length of a field in which the planting bed is arranged. Accordingly, the planting bed 107 typically extends about 100 m to about 1000 m in length. In some examples, the furrows 105 have a depth (e.g., with respect to the top surface of the planting bed 107) of about 5 cm to about 15 cm (e.g., about 10 cm) and a minimum width of about 40 cm to about 60 cm (e.g., about 50 cm). In some examples, the planting beds 107 are spaced apart (e.g., as measured between centerlines of adjacent planting beds 107) in the field by about 175 m to about 225 m. The plant inspection system 100 is configured accordingly to operate on the planting beds 107.

The plant inspection system 100 is positioned forward of a cutting blade 109 (e.g., a bandsaw) and a conveyor 111 (e.g., a belt conveyor) of the harvester. The conveyor 111 is operable to move severed plants 103 rearward towards a collection container and personnel riding on the harvester who place the plants 103 into the collection containers. The cutting blade 109 and the conveyor 111 can be lowered to harvest plants 103 from the planting bed 107 (e.g., to sever plants 103 from the planting bed 107 and to convey the severed plants 103) and raised to avoid harvesting plants 103 from the planting bed 107 (e.g., to avoid contact between the cutting blade 109 and the conveyor 111 and the plants 103). During a harvesting operation, the cutting blade 109 and the conveyor 111 are maintained at a predetermined cutting distance above the planting bed 107, which can vary in elevation according to an elevation of the field in which the planting bed 107 is arranged. Accordingly, the cutting blade 109 and the conveyor 111 float about 5 cm to about 10 cm (e.g., about 8 cm) above the planting bed 107.

The cutting blade 109 and the conveyor 111 typically have a cutting width that is at least as large as the width of the planting bed 107. Therefore, in some examples, the cutting blade 109 and the conveyor 111 have a cutting width of about 150 cm to about 170 cm (e.g., about 160 cm). For illustration purposes, only components of the plant inspection system 100 and of the harvester that are significant to the description of plant inspection are shown. However, it will be understood that other standard electrical and mechanical components will be included. For example, the plant inspection system 100 and/or the harvester may include a generator and/or batteries for powering the electrical components.

The plant inspection system 100 includes a machine vision system 102 that generates images of the plants 103, two connection arms 104 by which the machine vision system 102 is attached to the harvester, two frames 106 that support the machine vision system 102, four wheels 108 attached (e.g., welded at hubs) to the frames 106, an enclosure 110 that houses various electrical components, and a cutter position sensor 148 (e.g., an ultrasonic sensor or laser position sensor) that detects a height of the cutting blade 109. The plant inspection system 100 also includes a programmable logic controller (PLC) 118 that is electrically coupled to the machine vision system 102, a GPS system 120 that provides field locations to the PLC 118, a cellular system 146 for remote communication and reporting, and a WiFi system 122 that wirelessly transmits data from the PLC to a computing device (e.g., a laptop computer, a tablet computer, a smartphone) that is used by an operator of the harvester. The PLC 118, the GPS system 120, cellular system 146, and the WiFi system 122 are housed within the enclosure 110.

The connection arms 104 include multiple segments. The connection arms 104 are attached at first ends 112 to the frame 115 along the front side of the harvester and are attached at second ends 114 to the machine vision system 102. The connection arms 104 are pivotable with respect to the frame 115 of the harvester at first ends 112 and, to a lesser extent, pivotable with respect to the machine vision system 102. The connection arms 104 position the machine vision system 102 at a distance of about 100 cm to about 200 cm (e.g., about [150] cm) forward of the harvester. The connection arms 104 are also operable to raise and lower the machine vision system 102 and other components attached directly or indirectly thereto while the harvester is maneuvered (e.g., turned) from one planting bed 107 to a next planting bed 107 when the harvester reaches an end of a planting bed 107. In this regard, the plant inspection system 100 includes two hydraulic cylinders 116 that are operable to raise and lower a height of the connection arms 104.

The plant inspection system 100 is configured such that the wheels 108 are positioned within the furrows 105 extending along the planting bed 107. The wheels 108, together with the connection arms 104, allow the harvester to push the plant inspection system 100 in the forward direction 101 in a manner such that the machine vision system 102 floats above the plants 103. Movements of the cutting blade 109 and the conveyor 111 of the harvester are independent of movements of the plant inspection system 100, such that the wheels 108 of the plant inspection system 100 remain on the ground irrespective of the height of the cutting blade 109 and the conveyor 111 above the plants 103. The frames 106, to which the wheels 108 are attached, are vertically adjustable relative to the machine vision system 102 to accommodate plants 103, planting beds 107, and fields of variable heights and elevations.

Figure 2:
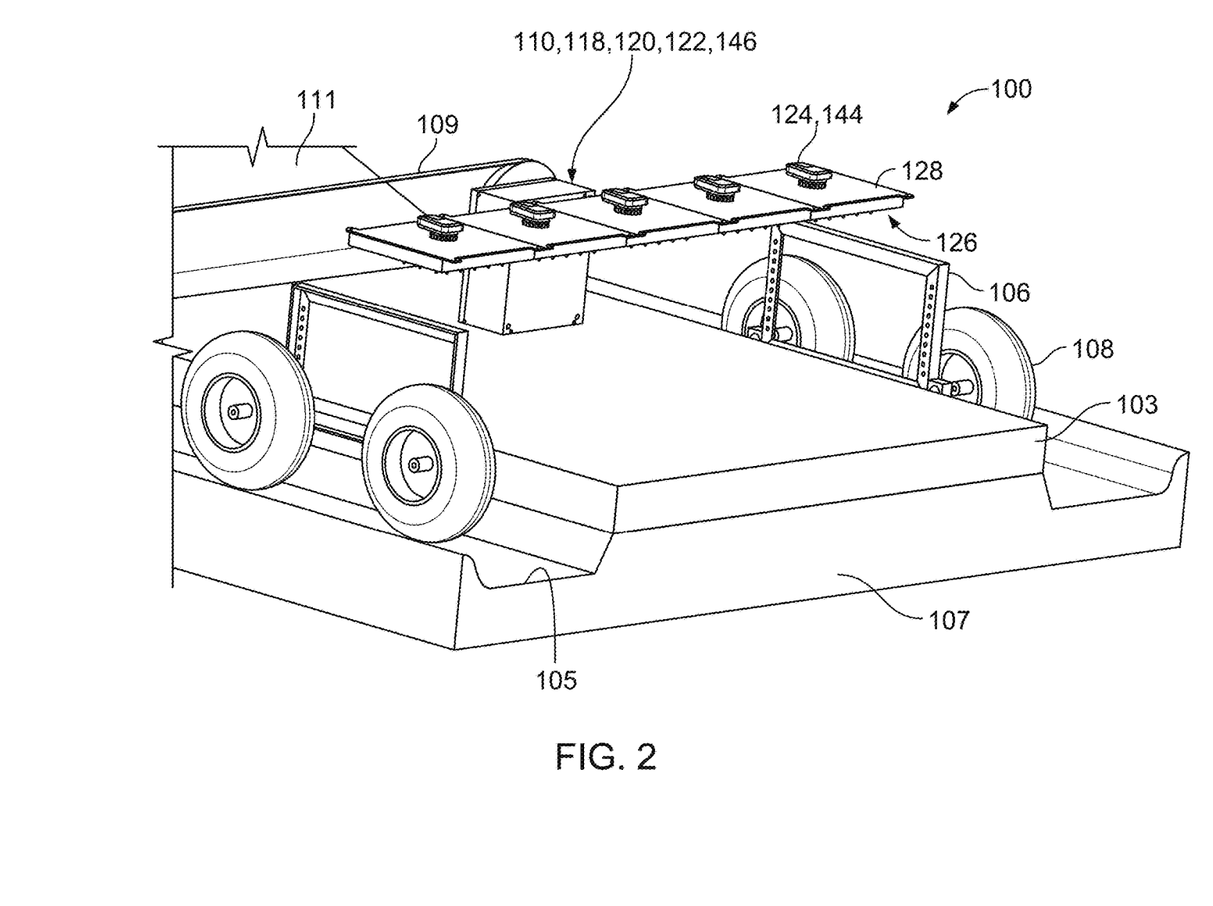
FIG. 2 is a perspective view of the plant inspection system of FIG. 1, with certain components removed for illustration purposes.

Referring to FIGS. 1 and 2, the machine vision system 102 extends across the width of the planting bed 107 and is operable to image the plants 103 from above the plants to identify contamination on surfaces of plant components (e.g., leaves and stems). The machine vision system 102 includes five cameras 124, five light arrays 126, and five panels 128 to which the cameras 124 and the light arrays 126 are respectively mounted. The machine vision system 102 also includes an upper rail 132, a lower rail 134 that is attached to the frames 106, and a hood 130 (e.g., a protective cover) that surrounds the five panels 128, the light arrays 126, and the upper rail 132. The enclosure 110 is attached to the lower rail 134. The lower rail 134 also provides attachment locations for the second ends 114 of the connection arms 104. In some examples, a height of the hood 130 (e.g., defined as a distance between the upper rail 132 and the lower rail 134) is about 20 cm to about 60 cm (e.g., about 36 cm).

The cameras 124 and the light arrays 126 are centrally mounted to respective panels 128 such that the cameras 124 and the light arrays 126 are spaced about evenly apart across the hood 130. The light arrays 126 may be provided as ring light arrays that surround the cameras 124 or as bar light arrays that are otherwise positioned in association with the cameras 124. In some examples, the ring light arrays may provide more uniform illumination than the bar light arrays. The light arrays 126 include multiple LEDs that have filters for sufficient illumination and desired image characteristics. The hood 130 is adapted to block (e.g., reduce the amount of) sunlight, other types of light, and precipitation that may otherwise impinge upon components of the plant inspection system 100 or upon the plants 103 in the fields of view during the harvesting operation. The plant inspection system 100 also includes a skirt 136 (e.g., a neoprene skirt) that covers a gap between the lower rail 134 and a top surface of plants 103. Like the hood 130, the skirt 136 is adapted to block light and precipitation that may otherwise impinge upon components of the plant inspection system 100 and upon the plants 103 in the fields of view. The skirt 136 can be mounted at various vertical positions along the lower rail 134 depending on the height of the plants 103.

The cameras 124 are oriented (e.g., horizontally) and positioned to image respective fields of view along the top surface of the plants 103. The cameras 124 may be standard resolution, color video graphics array (VGA) cameras known to a person skilled in the art. For example, the cameras 124 may have a pixel count of 480×640 and image a 27 cm×36 cm field of view. The camera resolution (e.g., pixel dimension) of such a field of view may be 0.056 cm, which is adequate for identifying contamination (e.g., feces, disease, or foreign matter) on components of the plants 103. The focal length selected for the cameras 124 is 6 mm. A working distance between lenses of the cameras 124 and the top surface of the plants is 45 cm. The cameras 124 can acquire images every 100 ms, allowing the cameras 124 to acquire three images of the same plant 103 while the inspection system 100 moves at a predetermined speed (e.g., about 65 cm/s) in the field 107. The images acquired by each camera 124 overlap the images acquired by a neighboring camera 124 by about 2.5 cm, such that no gaps exist between images acquired of adjacent fields of view. The fields of view (e.g., when aligned serially) cover a width of about 180 cm.

Figure 3:
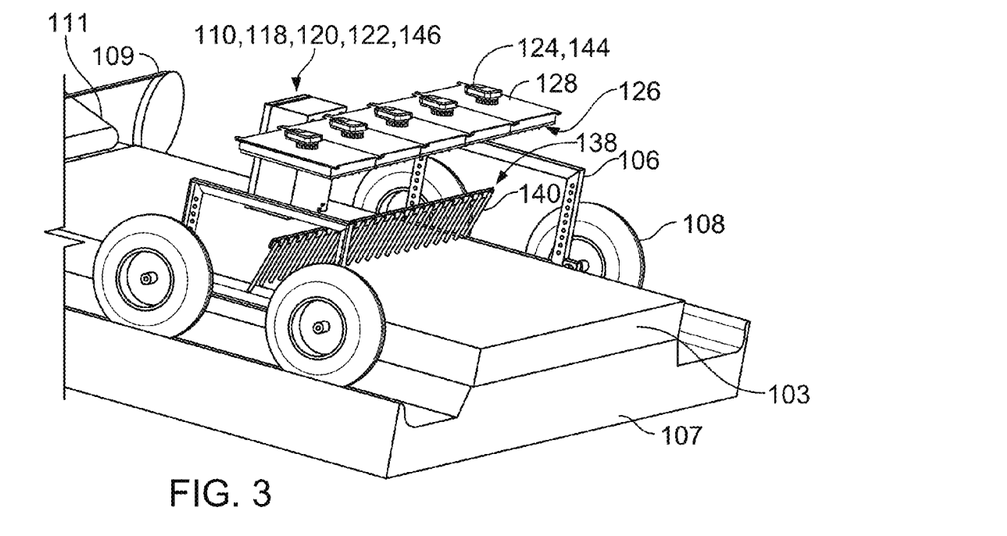
FIG. 3 is a perspective view of the plant inspection system of FIG. 1, including a plant manipulation device in the form of a flexible comb and with certain components removed for illustration purposes.
Figure 4:
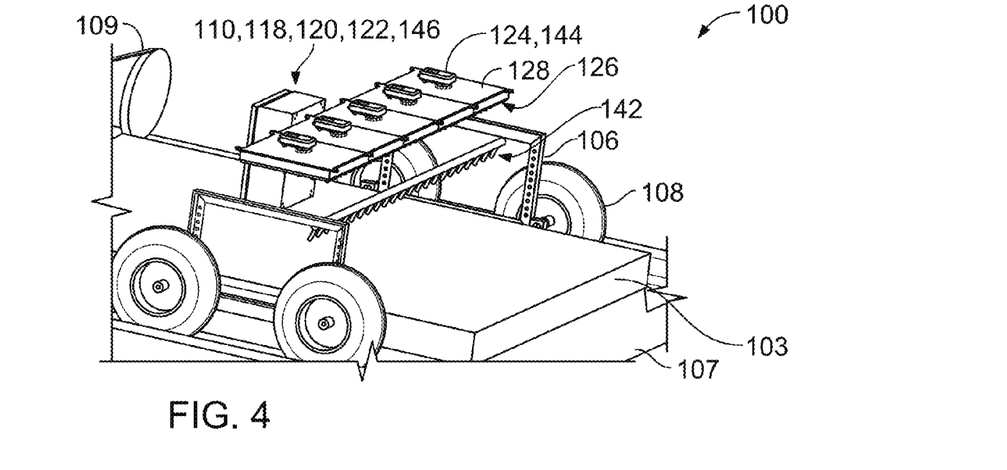
FIG. 4 is a perspective view of the plant inspection system of FIG. 1, including a plant manipulation device in the form of a set of air nozzles and with certain components removed for illustration purposes.

Referring to FIGS. 3 and 4, the plant inspection system 100 also includes a manipulation device (omitted from FIGS. 1 and 2 for clarity) for moving components (e.g., leaves, stems, and other components) of the plants 103 forward and backward in order to expose hidden contamination to the cameras 124 above the plants 103. In some examples, hidden contamination may be located on undersides of components of the plants 103 or located on components of the plants 103 that are below the top surface of the plants 103. According to an actuation rate of the manipulation device and the image acquisition rate (e.g., 10 fps) of the cameras 124, at least one of the three images captured by a camera 124 and showing a particular plant 103 will capture any hidden contamination in an exposed state.

Referring particularly to FIG. 3, in some embodiments, the manipulation device is a flexible comb 138 that is mounted to the upper rail 132 inside of the hood 130, below the cameras 124, and above the plants 103. The comb 138 has flexible finger-like projections 140 (e.g., urethane cords) that extend down into the plants 103 and that are moved forward and backward across the plants 103 while the cameras 124 acquire images of the plants. In some examples, the finger-like projections 140 remain fixed (i.e., are not moved forward and backward) relative to the cameras 124 such that the motion of the harvester pushes the comb 138 through the plants 103, thereby moving the components of the plants 103. In this manner, the finger-like projections 140 move the components of the plants 103 forward to expose hidden contamination.

Referring particularly to FIG. 4, in some embodiments, the manipulation device is a set of air nozzles 142 mounted to the upper rail 132, inside of the hood 130, below the cameras 124, and above the plants 103. The air nozzles 142 can apply controlled bursts of air to the plants 103 in an alternating manner while the cameras 124 acquire images of the plants 103. The alternating air bursts from the air nozzles 142 move components of the plants 103 forward and backward to expose hidden contamination.

Figure 5A:
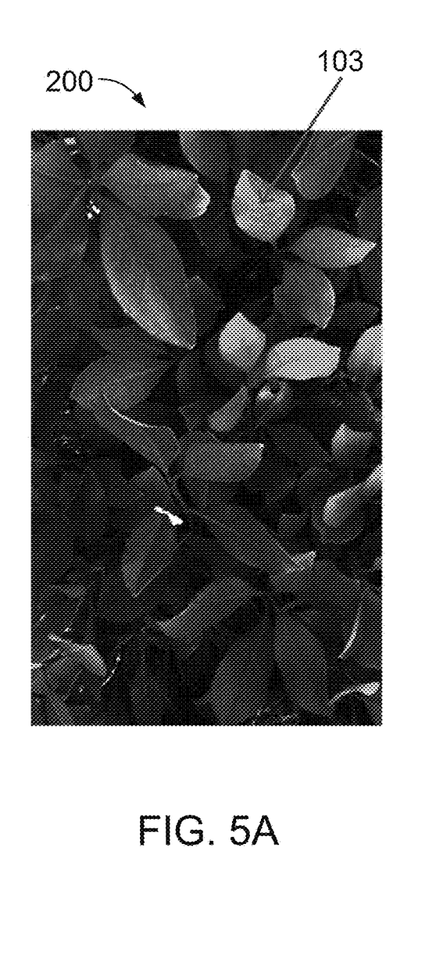
FIGS. 5A, 5B, and 5C respectively display a standard image acquired by a camera of the plant inspection system of FIG. 1, a filtered machine vision view produced by a processor of the camera, and a color machine vision view generated by the processor of the camera.
Figure 5B:
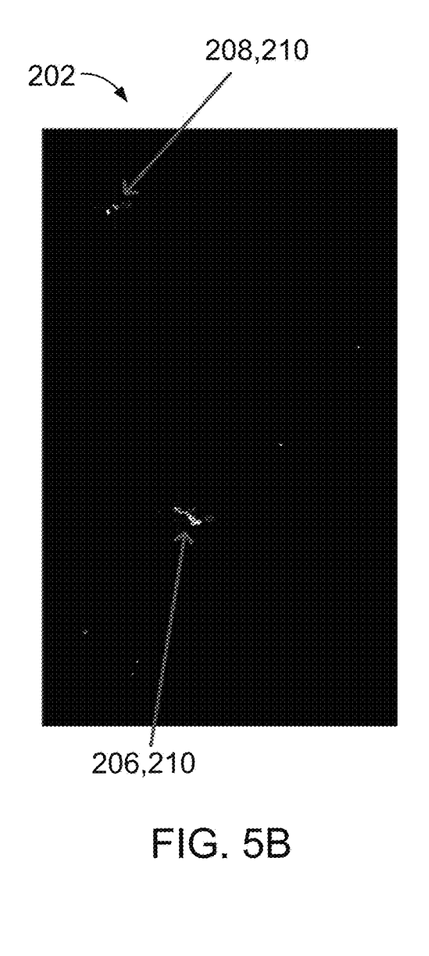
Figure 5C:
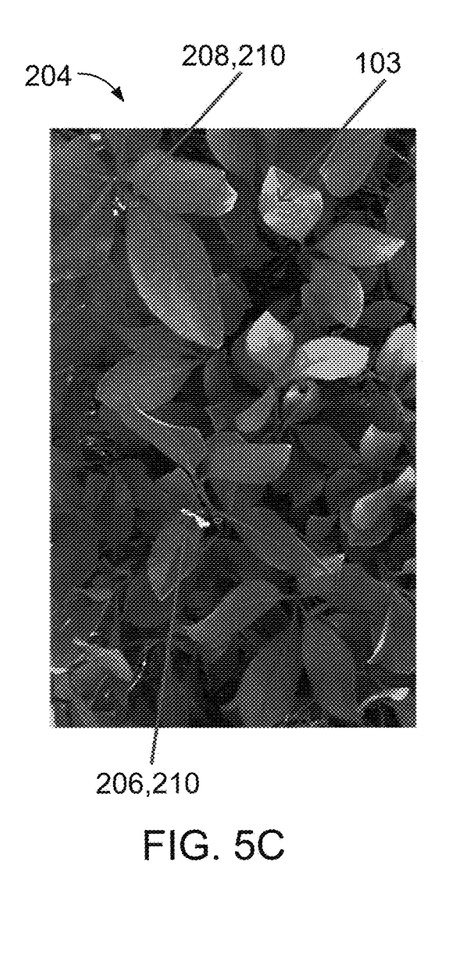

FIGS. 5A-5C respectively display an image 200 acquired by a camera 124, a corresponding filtered machine vision view 202 (e.g., with color filtration turned on) generated by a respective camera processor 144, and a corresponding color machine vision view 204 (e.g., with color filtration turned off) generated by the respective camera processor 144. Following capture of the image 200 by the camera 124, the camera processor 144 performs a color filtration on the image 200 to generate a binary image (e.g., a black and white image) in which background features (e.g., soil and plant components, such as leaves and stems) are eliminated (e.g., shown as black) based on colors typically associated with such features, and in which contamination is shown as a white color. For example, the camera processor 144 removes green and soil color ranges from the image 200 that are typically associated with such background features. (In some examples, if multiple types of contamination with different color profiles are to be detected, then the processor 144 creates separate binary images for each type of contamination.) The processor 144 then performs a blob analysis on the binary image to generate the filtered machine vision view 202. That is, the processor 144 performs a mathematical analysis that finds regions in the binary image that share the same one or more properties (e.g., the same one or more colors) and combines the regions into blobs. For example, the regions of interest may exhibit a range of white colors, grey colors, and black colors that meet a color criterion for bird feces. In some examples, the regions of interest may exhibit a range of yellow colors that meet a color criterion for fungal diseases or a range of brown colors that meet a color criterion for tip burn. Regions of interest that do not meet a color criterion for bird feces (or other animal feces), fungal diseases, leaf tip burn, or other diseases may meet a color criterion for rodents, a color criterion for insects, or an exclusion color criterion for foreign matter. Accordingly, the processor 144 finds pixels in the image 200 that meet the color criterions for bird feces, fungal diseases, tip burn, rodents, insects, and foreign matter by processing binary images associated with each type of contamination.

The processor 144 then combines the pixels meeting a particular color criteria (e.g., pixels that are adjacent or sufficiently close to each other) into a blob (e.g., as illustrated by the blobs 206, 208) and draws a border around the blob, thereby defining a pattern (e.g., a shape) of the blob. In some examples, bird feces appear as spots or splotches on plants 103. In some examples, fungal diseases appear as chlorotic lesions or small circular lesions on plants 103. In some examples, leaf tip burn is exhibited by withering of leaf tips. The camera processor 144 further determines a size of the blob (e.g., a length and/or a width of the respective pattern). The processor 144 compares the pattern, size, and color of the blob to known (e.g., stored) patterns, sizes, and colors of bird feces (or other animal feces), fungal diseases, leaf tip burn, plant viruses, other diseases, rodents, insects, and foreign matter. Blobs with patterns that sufficiently match known patterns of contamination, that meet a minimum size threshold (e.g., a stored threshold value) for the contamination, and that fall within a color range associated with a particular type of contamination can be identified accordingly and marked with a crosshair 210 (e.g., the blue crosshair faintly shown in FIGS. 5B and 5C). Blobs with patterns that do not have recognizable features (e.g., recognizable shape profiles), that do not meet a minimum size threshold, or that do not fall within color ranges associated with particular types of contamination may be ignored by the camera processor 144. Once the camera processor 144 performs the blob analysis on the binary image to generate the filtered machine vision view 202, the camera processor 144 can turn off the color filtration, thereby generating the color machine vision view 204.

In some examples, the camera processor 144 varies the Red Green Blue (RGB) data of the pixels in the image 200 prior to performing the blob analysis, in order to brighten the image 200, to enhance the pixel colors in the image 200, and/or to increase contrast among the colors in the image 200, thereby producing an enhanced image. Such processing can improve the detection of contamination in dim light (e.g., at night or when the contamination is shadowed by leaves or other plant material) or in cases where the contamination is affected by moisture or other environmental contaminants.

Once the camera processor 144 identifies a blob (e.g., the blob 206 or the blob 208) corresponding to a particular type of contamination, the camera processor 144 runs an algorithm to determine digital image position coordinates of the blob (e.g., xy position coordinates of a centroid of the blob in a digital coordinate system of the digital image). The processor 144 then provides the digital image position coordinates and machine vision views 202, 204 with identified regions of contamination to the PLC 118. The PLC 118 downloads GPS coordinates of the camera 124 from the GPS system 120 and determines field position coordinates of the regions of contamination based on the digital image position coordinates and the GPS coordinates. The PCL 118 stores the machine vision views 202, 204, the field position coordinates of the regions of contamination, the type of contamination identified, and a summary of an evasive action taken to avoid harvesting the contaminated plants 103, which will be discussed in more detail below. In some examples, such parameters are stored in association with one more of a date, a time, and other field location parameters. The camera processor 144 sends the machine vision views 202, 204 showing identified regions of contamination and associated digital image position coordinates to the PLC 118 in a continuous manner as regions of contamination are identified.

Using the above-described image analyses, the plant inspection system 100 can quickly process large amounts of information to recognize colors and patterns to identify regions of contamination on surfaces of the plants 103. In contrast, conventional, manual inspections performed by the operator of the harvester or by field personnel cannot achieve such an extent of inspection detail in a feasible manner (e.g., in a reasonable amount of time, in a manner that systematically identifies hidden contamination, or performing the harvesting operation during daylight hours, when visibility is optimal but when climate and plant conditions are sub-optimal). Accordingly, as compared to such conventional analyses, the above-described image analyses are more accurate, provide more information, and are more successful in correctly identifying contaminated plants 103.

When the PLC 118 receives an indication (e.g., machine vision views 202, 204 showing an identified region of contamination along with digital image position coordinates) that a region of contamination has been identified, the PLC 118 sends a control signal to a light stand (omitted for clarity) on the plant inspection system 100 to actuate a red warning light within the light stand. The PLC 118 also sends a control signal via the WiFi system 122 to the computing device used by the operator of the harvester to display a message on the computing device instructing the operator to raise the cutting blade 109. The red warning light and the message can alert the operator to the contaminated plant 103. In response to the red warning light and/or to the message displayed on the computing device, the operator will take actions to raise the cutting blade 109 (and the associated conveyor 111) to avoid harvesting the contaminated plant 103 from the planting bed 107 (e.g., to prevent the cutting blade 109 and the conveyor 111 from contacting the contaminated plant 103).

According to a distance between the cutting blade 109 and the plant inspection system 100 (e.g., about 150 cm), the operator will have about 1 s to about 3 s (e.g., about 2 s) to raise the cutting blade 109 to prevent the cutting blade 109 from contacting the contaminated plant 103 from the time that the operator perceives the red warning light or the message. In some examples, the operator raises the cutting blade 109 by about 4 cm to about 8 cm above the plants 103 to clear (e.g., avoid contact with) the contaminated plant 103. The cutter position sensor 113 records a height of the cutting blade 109 (e.g., relative to the top surface of the planting bed 107) achieved by the cutting blade 109 during lifting. Based on the height achieved by the cutting blade 109 and the forward movement of the harvester, the PLC 118 determines whether or not the cutting blade 109 successfully avoided contact with the contaminated plant 103. If the cutting blade 109 successfully bypasses the contaminated plant 103, then the PLC 118 sends a control signal to the light stand to actuate a green light (e.g., an "all clear" light) in the light stand. The PLC 118 also sends a control signal to the computing device used by the operator of the harvester to display a message indicating that the cutting blade 109 can be lowered. In response to the green light and/or to the message displayed on the computing device, the operator will take actions to lower the cutting blade 109 (and the associated conveyor 111) to continue harvesting plants 103 from the planting bed 107.

If, on the other hand, the PLC 118 determines that the cutting blade 109 was not raised fast enough or high enough to avoid contact with the contaminated plant 103, then the PLC 118 will send a control signal to the light stand to actuate a blinking red light. The PLC 118 will also send a control signal via the WiFi system 122 to the computing device used by the operator of the harvester to display a message indicating that the contaminated plant 103 was harvested, that the contaminated plant 103 should be removed from the harvester, and that, in some cases (e.g., if the contamination is identified as bird feces), that the harvester should be decontaminated (e.g., disinfected or sterilized) where contact was made with the contaminated plant 103.

As mentioned above, the PLC 118 is programmed to store a log of all machine vision views 202, 204 showing regions of contamination, field position coordinates of the regions of contamination, types of contamination identified, successful and failed attempts to avoid harvesting contaminated plants 103, and dates and times at which the attempts occurred. Using the information in the log, the PLC 118 can generate a field report at a predetermined time (e.g., at an end of a harvesting operation or at a certain time of the day). The PLC 118 may send the field report to the computing device used by the operator or to another computing device remote from the harvester and the plant inspection system 100 via the cellular system 146 so that actions can be taken by growers of the field. Such actions may include authorizing shipment of plant products or holding plant products for manual inspection.

Owing to capabilities of the plant inspection system 100 to illuminate a planting bed, to identify contaminated plants, and to alert an operator of a harvester to the presence of contaminated plants in real time, the plant inspection system 100 can allow a field to be harvested efficiently and during periods of limited visibility (e.g., at night) while avoiding dangerous contamination (e.g., salmonella poisoning resulting from bird feces) of previously harvested plants such that food safety is maintained and while avoiding costly shutdowns and decontaminations of the harvester or of a downstream (e.g., post-harvest) processing line (e.g., at a processing plant).

Figure 6:
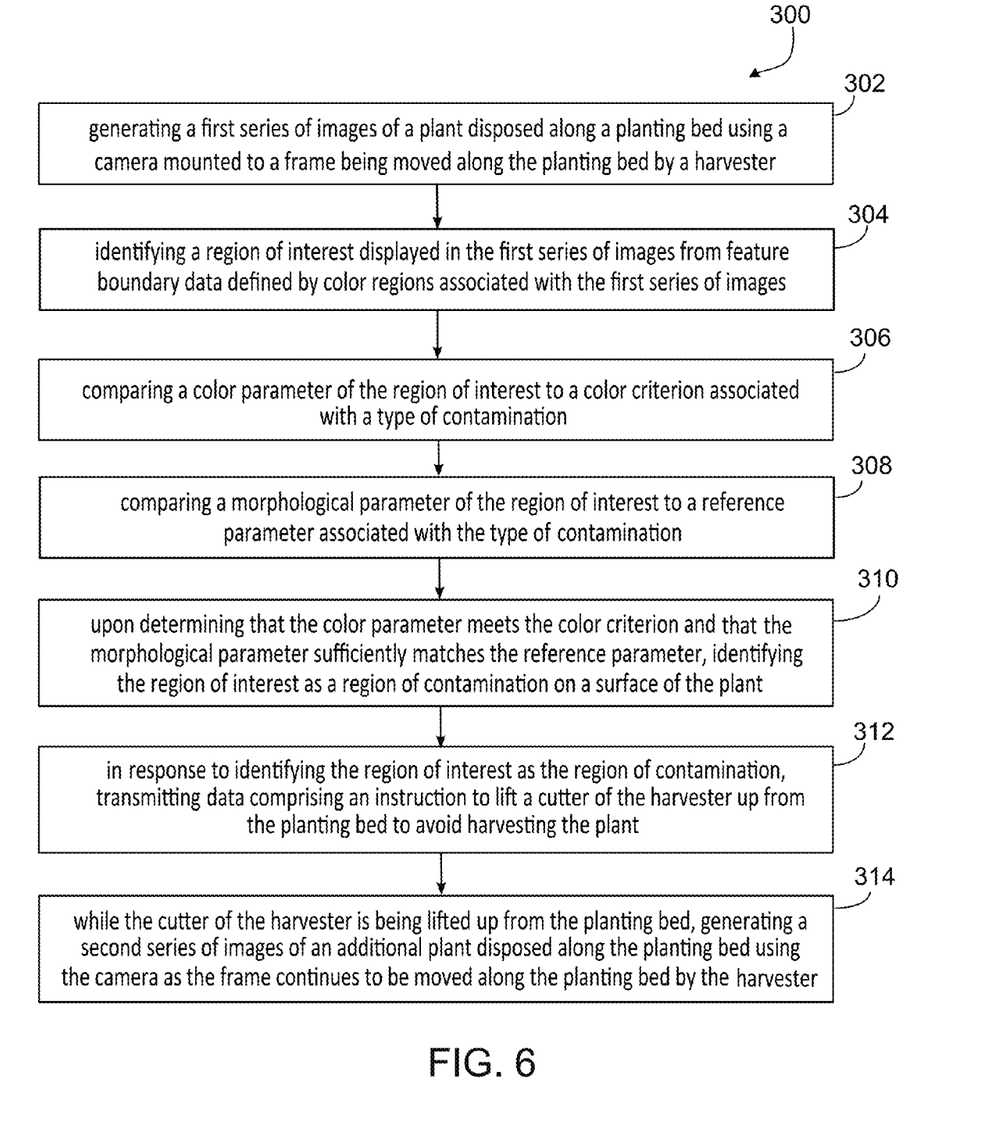
FIG. 6 is a flow chart of an example process for inspecting plants for contamination.

FIG. 6 displays a flow chart of an example process 300 for inspecting plants (e.g., leafy vegetable plants) disposed along a planting bed using the above-described plant inspection system. As a harvester moves (e.g., pushes) the plant inspection system along the planting bed, a camera of the plant inspection system generates (e.g., acquires) a first series of images of a plant (e.g., a leafy vegetable plant) disposed along the planting bed (302). In some examples, the camera generates images at a rate of 10 fps, allowing the camera to generate three images of the plant while the harvester moves the plant inspection system along the planting bed at a predetermined speed (e.g., about 65 cm/s). While the camera generates the series of images, a light array associated with the camera illuminates the plant, a hood surrounding the light array blocks environmental light (e.g., sunlight) from impinging upon the plant, and a manipulation device (e.g., a set of air nozzles or a flexible comb) is actuated to move the plant forward and backward to expose hidden regions of contamination on a surface of the plant.

A processor associated with the camera then identifies a region of interest displayed in the first series of images from feature boundary data defined by color regions associated with the first series of images (304). For example, the processor performs a blob analysis on the images by combining pixels that are adjacent or sufficiently close to each other and within a certain range of colors into a blob. The processor then determines a border around the blob, thereby defining a pattern (e.g., a shape) of the blob. The processor further generates a series of machine vision views associated with the first series of images and displaying the blob. Next, the processor compares a color parameter of the region of interest to a color criterion associated with a type of contamination (306) and compares a morphological parameter (e.g., a size or a shape) of the region of interest to a reference parameter associated with the type of contamination (308).

Upon determining that the color parameter meets the color criterion and that the morphological parameter sufficiently matches the reference parameter, the processor identifies the region of interest as a region of contamination (e.g., feces, disease, rodents, insects, or foreign matter) on a surface of the plant (310). In response to the processor identifying the region of interest as the region of contamination, a PLC communicably coupled to the processor transmits data including an instruction to lift a cutter of the harvester up from the planting bed to avoid harvesting (e.g., contacting and further severing) the plant (312). In some examples, the instruction is a signal to actuate a light that can alert an operator of the harvester to the region of contamination. In some examples, the instruction is a message displayed on a computing device associated with the harvester (e.g., a computing device in proximity to the operator of the harvester or a computing device remote from the harvester). In other cases, the instruction is a control signal to automatically lift the cutter.

In response to the processor identifying the region of interest as the region of contamination, the PLC also stores a series of machine vision views associated with the first series of images in association with position coordinates of the region of contamination (e.g., based on GPS coordinates received from a GPS system) and stores a record of a lifting action taken by the cutter to avoid harvesting the plant. The PLC can generate a report including the series of machine vision views, the position coordinates of the region of contamination, the record of the lifting action, and other information related to an identification of the region of interest as the region of contamination. Based on a height to which the cutter was lifted and an amount of time elapsed between the data being transmitted and the cutter being lifted, the PLC can determine whether or not the cutter contacted the plant. If the cutter cleared the plant, then the PLC transmits data including an instruction to lower the cutter of the harvester towards the planting bed to continue harvesting plants from the planting bed. If the cutter did not clear the plant, then the PLC transmits data including an instruction to cease the harvesting operation and to decontaminate one or more portions (e.g., the cutter and a conveyor) of the harvester.

Figure 7:
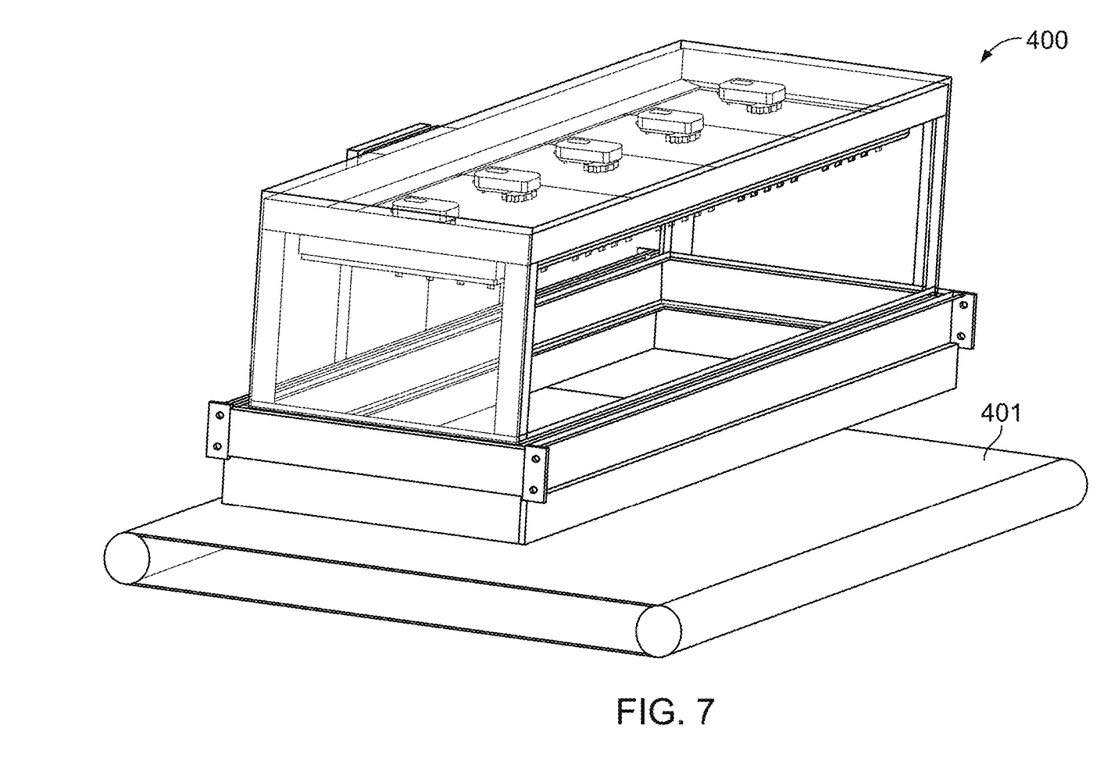
FIG. 7 is a perspective view of a plant contamination system positioned above a conveyor belt.

While the cutter of the harvester is being lifted up from the planting bed, the camera generates a second series of images of an additional plant disposed along the planting bed as the frame continues to be moved along the planting bed by the harvester (314). In some embodiments, an additional camera mounted to the harvester and downstream of the cutter generates a third series of images of the additional plant after the additional plant has been harvested by the cutter and transported to a conveyor belt, as will be discussed in more detail below with respect to FIG. 7.

While the plant inspection system 100 has been described as providing a signal that instructs an operator of a harvester to manually raise and lower a cutting blade of the harvester, in some embodiments, the PLC 118 of the plant inspection system 100 is programmed to send a control signal to the harvester that automatically causes the cutting blade to be raised and lowered, which can shorten a response time to avoid contaminated plants, as compared to an amount of time required for the operator to manually takes actions to raise and lower the cutting blade.

While the controller of the plant inspection system 100 has been described as the PLC 118, in some embodiments, a plant inspection system that is substantially similar in construction and function to the plant inspection system 100 includes a PC controller instead of the PLC 118. Such a PC controller will typically have more computational power than the PLC 118.

While the plant inspection system 100 has been described and illustrated as being used to inspect baby green vegetable plants, in some examples, the plant inspection system 100 is used to inspect mature green vegetable plants (e.g., larger leafy vegetable plants). Example mature green vegetable plants that may be inspected by the plant inspection system 100 include iceberg lettuce plants, romaine plants, butter plants, and spinach plants. In some embodiments, a plant inspection system that is configured to inspect mature green vegetable plants is similar in structure and function to the plant inspection system 100, except that the plant inspection system is modified to include cameras disposed along sides of the plant inspection system to provide images of sides of the larger plants. In addition to data related to identified contamination, camera processors of such a plant inspection system may be programmed to provide additional data related to the plants, such as sizes of the plants, locations of the plants, and maturity of the plants, which can aid in harvesting the plants. A PLC of the plant inspection system may be programmed to provide additional field data related to the plants, such as a total number of plants and a density of plants. Such a plant inspection system may also include sensors (e.g., laser sensors or acoustic sensors) disposed along sides of the plant inspection system to profile sides of the plants to for precise determination of center locations of the plants. In some examples, the plant inspection system 100 and the modified plant inspection system can be used to harvest crops (e.g., broccoli plants and cauliflower plants) grown in a field and harvested selectively (e.g., individually).

While the plant inspection system 100 has been described and illustrated as being attached to a frontal frame of a harvester, in some embodiments, a plant inspection system may be located above a conveyor belt for inspecting plants that have been cut from a planting bed. For example, FIG. 7 displays a perspective view of a plant inspection system 400 that is positioned above a conveyor 401 (e.g., a belt conveyor). The plant inspection system 400 is substantially similar in construction and function to the plant inspection system 100, except that the plant inspection system 400 does not include the connection arms 104, the frames 106, the wheels 108, the hydraulic cylinders 116, the manipulation devices 138, 140, or the cutter position sensor 148 of the plant inspection system 100. In some examples, the conveyor 401 may be a conveyor on a harvester downstream of a cutting blade of the harvester, a conveyor that transports plants in from a field (e.g., an infeed conveyor), or a conveyor in a processing line of a processing plant, where plants are washed and packaged. In some examples, the plant inspection system 400 can be mounted above multiple such conveyors at different locations, thereby increasing the number of times that plants are imaged and analyzed for contamination prior to packaging. In some cases, plants inspected on an infeed conveyor or on a conveyor in a processing plant may be produce that was grown in trees, such as peaches, nectarines, figs, olives, walnuts, chestnuts, pecans, almonds, cherries, apples, pears, plums, apricots, and various other citrus plants.

While a number of examples have been described for illustration purposes, the foregoing description is not intended to limit the scope of the invention, which is defined by the scope of the appended claims. There are and will be other examples, modifications, and combinations within the scope of the following claims.

What is claimed is:

1. A method of operating a plant inspection system to inspect plants for contamination, the method comprising:
   generating a first series of images of a plant disposed along a planting bed via a camera mounted to a frame being moved along the planting bed by a harvester;
   identifying, via a processor associated with the camera, a region of interest displayed in the first series of images from feature boundary data defined by color regions associated with the first series of images;
   comparing, via the processor, a color parameter of the region of interest to a color criterion associated with a type of contamination;
   comparing, via the processor, a morphological parameter of the region of interest to a reference parameter associated with the type of contamination;
   upon determining that the color parameter meets the color criterion and that the morphological parameter sufficiently matches the reference parameter, identifying, via the processor, the region of interest as a region of contamination on a surface of the plant;
   in response to identifying the region of interest as the region of contamination, transmitting, via a controller that is communicably coupled to the processor, data comprising an instruction to lift a cutter of the harvester up from the planting bed to avoid harvesting the plant; and
   while the cutter of the harvester is being lifted up from the planting bed, generating a second series of images of an additional plant disposed along the planting bed via the camera as the frame continues to be moved along the planting bed by the harvester.

2. The method of claim 1, wherein the camera comprises a portion of a machine vision system, the machine vision system being configured to analyze the first and second series of images.

3. The method of claim 2, wherein the machine vision system is configured to generate first and second series of machine vision views respectively associated with the first and second series of images.

4. The method of claim 1, wherein the camera is located forward of the harvester such that the camera generates images of plants disposed along the planting bed before the plants can be severed from the planting bed by the cutter.

5. The method of claim 1, further comprising maintaining a predetermined vertical distance between the camera and the planting bed.

6. The method of claim 1, further comprising illuminating the plant using one or more lights associated with the camera while the first and second series of images are generated.

7. The method of claim 1, further comprising blocking environmental light from impinging upon the plant and the additional plant while the first and second series of images are generated, respectively.

8. The method of claim 1, further comprising identifying the region of interest using a blob analysis.

9. The method of claim 8, wherein the blob analysis identifies portions of the region of interest that share one or more colors and determines a border around the portions.

10. The method of claim 1, wherein the morphological parameter comprises a shape of the region of interest.

11. The method of claim 1, wherein the morphological parameter comprises a size of the region of interest.

12. The method of claim 1, wherein the type of contamination comprises fecal matter, disease, rodents, insects, or foreign matter.

13. The method of claim 1, wherein the plant comprises a leafy vegetable plant.

14. The method of claim 13, wherein the leafy vegetable plant comprises a baby green vegetable plant.

15. The method of claim 13, wherein the leafy vegetable plant comprises a mature green vegetable plant.

16. The method of claim 1, further comprising storing a first series of machine vision views associated with the first series of images in association with position coordinates of the region of contamination in response to identifying the region of interest as the region of contamination.

17. The method of claim 16, further comprising storing a record of a lifting action taken by the cutter to avoid harvesting the plant.

18. The method of claim 17, further comprising generating a report comprising information related to an identification of the region of interest as the region of contamination.

19. The method of claim 1, further comprising determining whether or not the cutter contacted the plant based on a height to which the cutter was lifted and an amount of time elapsed between the data being transmitted and the cutter being lifted.

20. The method of claim 1, wherein the data is transmitted wirelessly.

21. The method of claim 1, wherein the instruction comprises an actuation of a light that can alert an operator of the harvester.

22. The method of claim 1, wherein the instruction comprises a message displayed on a computing device associated with the harvester.

23. The method of claim 1, wherein the instruction comprises a control signal to automatically lift the cutter.

24. The method of claim 1, further comprising transmitting data comprising a subsequent instruction to lower the cutter of the harvester towards the planting bed to continue harvesting plants from the planting bed after the cutter has been lifted up from the planting bed.

25. The method of claim 1, further comprising transmitting data comprising a subsequent instruction to cease a harvesting operation and to decontaminate one or more portions of the harvester.

26. The method of claim 1, further comprising moving the plant to expose hidden regions of contamination on the surface of the plant while the first and second series of images are generated.

27. The method of claim 26, wherein moving the plant comprises moving the plant forward and backward with a flexible comb.

28. The method of claim 26, wherein moving the plant comprises blowing air toward the plant.

29. The method of claim 1, further comprising generating a third series of images of the additional plant using an additional camera mounted to the harvester after the additional plant has been harvested by the cutter and transported to a conveyor belt.

30. A plant inspection system, comprising:
a camera that is configured to generate a first series images of a plant disposed along a planting bed, the camera mounted to a frame being moved along the planting bed by a harvester;
a processor that is associated with the camera and configured to:
identify a region of interest displayed in the first series of images from feature boundary data defined by color regions associated with the first series of images,
compare a color parameter of the region of interest to a color criterion associated with a type of contamination,
compare a morphological parameter of the region of interest to a reference parameter associated with the type of contamination, and
upon determining that the color parameter meets the color criterion and that the morphological parameter sufficiently matches the reference parameter, identify the region of interest as a region of contamination on a surface of the plant; and
a controller that is communicably coupled to the processor and configured to transmit data comprising an instruction to lift a cutter of the harvester up from the planting bed to avoid harvesting the plant in response to the processor identifying the region of interest as the region of contamination, while the camera generates a second series of images of an additional plant disposed along the planting bed as the frame continues to be moved along the planting bed by the harvester.

* * * * *